United States Patent
Molina Hernandez et al.

(10) Patent No.: US 11,736,815 B2
(45) Date of Patent: Aug. 22, 2023

(54) INTERFERER REMOVAL FOR REDUCING IMPACT OF PERIODIC INTERFERENCE SIGNALS ON ANALOG VIDEO TRANSMISSION

(71) Applicant: Analog Devices International Unlimited Company, Limerick (IE)

(72) Inventors: Isaac Molina Hernandez, Valencia (ES); Sean M. Mullins, Limerick (IE)

(73) Assignee: Analog Devices International Unlimited Company, Limerick (IE)

( * ) Notice: Subject to any disclaimer, the term of this patent is extended or adjusted under 35 U.S.C. 154(b) by 258 days.

(21) Appl. No.: 17/121,821

(22) Filed: Dec. 15, 2020

(65) Prior Publication Data
US 2022/0191347 A1    Jun. 16, 2022

(51) Int. Cl.
| | |
|---|---|
| H04N 5/21 | (2006.01) |
| H04N 23/81 | (2023.01) |
| H04N 5/073 | (2006.01) |
| H04N 5/213 | (2006.01) |
| H04N 7/083 | (2006.01) |

(52) U.S. Cl.
CPC ........... *H04N 23/81* (2023.01); *H04N 5/0736* (2013.01); *H04N 5/213* (2013.01); *H04N 7/083* (2013.01)

(58) Field of Classification Search
CPC ...... H04N 5/217; H04N 5/0736; H04N 5/213; H04N 7/083
See application file for complete search history.

(56) References Cited

U.S. PATENT DOCUMENTS

| | | |
|---|---|---|
| 3,527,877 A | 9/1970 | Walker |
| 3,676,589 A | 7/1972 | Jetzt |
| 3,924,060 A | 12/1975 | Bedford |
| (Continued) | | |

FOREIGN PATENT DOCUMENTS

CN    111866417 A    11/2020

OTHER PUBLICATIONS

Yoshizawa et al., *Noise Reduction for Periodic Signals Using High-Resolution Freguency Analysis*, EURASIP Journal on Audio, Speech, and Music Processing 2011, 19 pages.
(Continued)

*Primary Examiner* — Twyler L Haskins
*Assistant Examiner* — Fayez A Bhuiyan
(74) *Attorney, Agent, or Firm* — Arentfox Schiff LLP

(57) ABSTRACT

Video systems with video receivers for receiving video signals transmitted in analog format over a video link are described. An example video receiver includes an interferer identification circuit and an interferer removal circuit. The interferer identification circuit is configured to identify a periodic interference signal (e.g., from one or more of vertical blanking intervals (VBIs)) of a received video signal. The interferer removal circuit is configured to generate a filtered video signal, where generation of the filtered video signal includes, for each line of a given frame of the received video signal, generating an adjusted interference signal by adjusting a phase of the identified interference signal to match a phase of a periodic noise signal in at least a portion of a horizontal blanking interval (HBI) associated with the line, and subtracting the adjusted interference signal from a plurality of active pixel values of the line.

20 Claims, 11 Drawing Sheets

(56) References Cited

U.S. PATENT DOCUMENTS

| | | | |
|---|---|---|---|
| 4,019,201 A | 4/1977 | Hartung et al. |
| 4,051,532 A | 9/1977 | Hilbert et al. |
| 4,398,210 A | 8/1983 | Liu et al. |
| 5,025,312 A | 6/1991 | Faroudja |
| 5,113,439 A | 5/1992 | Hashimoto |
| 5,315,385 A | 5/1994 | Reime |
| 5,519,454 A | 5/1996 | Willis |
| 6,184,919 B1 | 2/2001 | Asprey et al. |
| 6,327,709 B1 | 12/2001 | Ovadia et al. |
| 6,335,718 B1 | 1/2002 | Hong et al. |
| 6,546,149 B1 | 4/2003 | Ruggiero et al. |
| 7,106,385 B1 | 9/2006 | Keen |
| 7,508,451 B2 | 3/2009 | Sheng et al. |
| 7,639,309 B2 | 12/2009 | Zhong |
| 7,932,955 B2 | 4/2011 | Zhong et al. |
| 8,040,437 B2 | 10/2011 | Zhong |
| 8,212,933 B2 | 7/2012 | Zhong |
| 9,554,021 B2 | 1/2017 | Kim et al. |
| 10,645,337 B1 * | 5/2020 | Mullins | H04N 5/213 |
| 10,687,011 B2 * | 6/2020 | Kuo | H04N 7/01 |
| 2002/0071508 A1 | 6/2002 | Takada et al. |
| 2002/0180891 A1 | 12/2002 | Lindsey |
| 2003/0058229 A1 | 3/2003 | Kawabe et al. |
| 2004/0091033 A1 | 5/2004 | Chen |
| 2005/0174487 A1 | 8/2005 | O'Connell |
| 2008/0158433 A1 | 7/2008 | Yun et al. |
| 2008/0297462 A1 | 12/2008 | Hsiung |
| 2010/0225820 A1 | 9/2010 | Yun et al. |
| 2011/0043509 A1 | 2/2011 | Lee |
| 2012/0033722 A1 | 2/2012 | Varadarajan et al. |
| 2013/0169695 A1 | 7/2013 | Hyeon et al. |
| 2015/0350595 A1 | 12/2015 | Chen |

OTHER PUBLICATIONS

*Chapters 9, Periodic Signal Extraction*, 9.1 Notice and Comb Filters for Period Signals, downloaded from Internet on Dec. 14, 2020, 29 pages.

*Removal of Period and Salt & Pepper Noise from an Image*, downloaded from Internet on Dec. 14, 2020, 9 pages.

Understanding Analog Video Signals, Maxim Integrated, Tutorial 1184, Sep. 28, 2002, 14 pages.

Bradley et al., Bulk Current Injection Testing of Cable Noise Reduction Techniques, 50 kHz to 400 MHz, http://ntrs.nasa.gov/search.jsp?R=20090030527 Mar. 5, 2019, 6 pages.

* cited by examiner

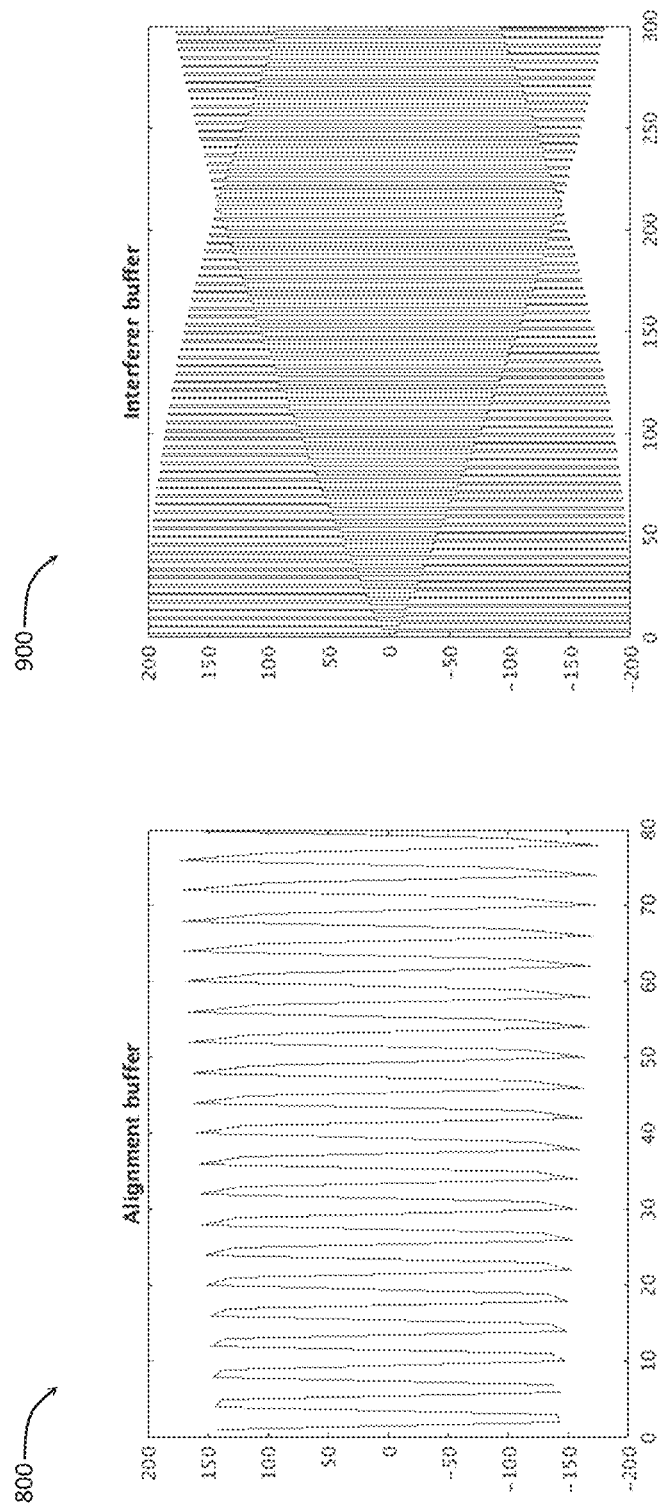

INTERFERER REMOVAL FOR REDUCING IMPACT OF PERIODIC INTERFERENCE SIGNALS ON ANALOG VIDEO TRANSMISSION

TECHNICAL FIELD OF THE DISCLOSURE

The present disclosure relates to the field of video transmission, and in particular to analog video transmission.

BACKGROUND

Video-based applications which rely on real-time video information acquisition, such as automotive infotainment, automotive driver assistance systems (ADAS), self-driving vehicles and security surveillance systems, generally involve the capture and generation of video data by one or more cameras. Such cameras may include, for example, charge-coupled devices (CCDs), complementary metal-oxide-semiconductor (CMOS) image sensors, or any other suitable video capturing devices which, broadly speaking, translate photons incident thereon into digital (raw or pixel) video data. In such applications, the video data will usually have to be transmitted in real-time from the camera to other devices for processing. Such devices may include, for example, electronic control units (ECUs) or components in communications or alerting systems. Such devices may, for example, execute specialized software to perform processing and analytical tasks based on the acquired image and/or video data and provide outputs accordingly. The combination of layers of transmission infrastructure enabling the transfer of the data between the camera and the video data receiving device/processor may be referred to as a "video link" or a "camera link."

A variety of factors can affect the cost, quality and robustness of a video link. Physical constraints such as space/surface area and also regulations can pose further constraints to the video link requirements or specifications, and thus trade-off and ingenuity will have to be exercised.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 8 provides an example illustration of an alignment buffer, according to some embodiments of the present disclosure;

FIG. 9 provides an example illustration of an interferer buffer, according to some embodiments of the present disclosure;

DESCRIPTION OF EXAMPLE EMBODIMENTS OF THE DISCLOSURE

Overview

Figure 1:
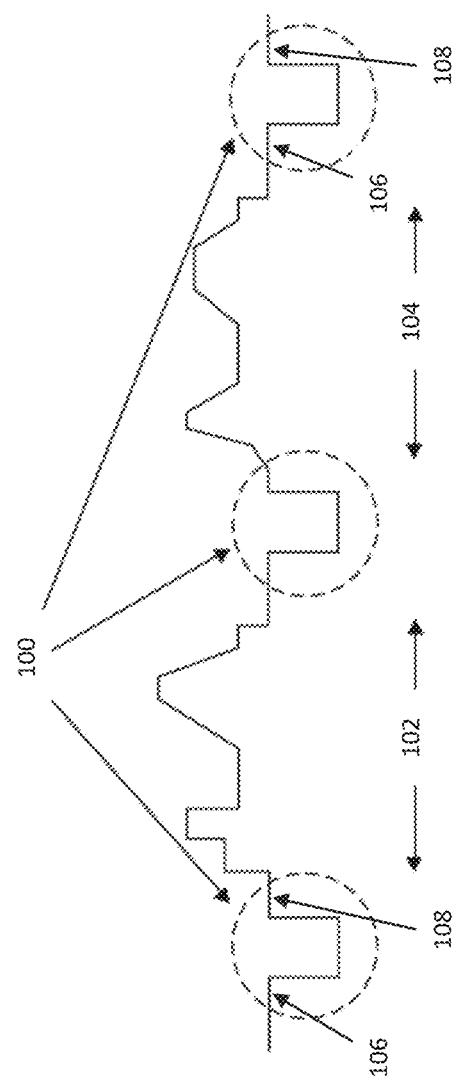
FIG. 1 is a schematic depiction of an example video signal, according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

Disclosed herein are systems and methods that use interferer removal for reducing impact of periodic interference signals (e.g., electromagnetic interference (EMI)) on analog transmission of video signals over wired links/connections. Such systems and methods may be particularly suitable for, but are not limited to, being used in a vehicle (where the term "vehicle" includes not only wheeled vehicle such as a car, a truck, or a bus, but also includes an airplane, an aircraft, or a spacecraft, for example), in a surveillance system, or in any other environment where a transmitter, placed at one location within such an environment (e.g., within a vehicle), and a receiver, placed at another location within such an environment, may need to communicate, in analog format, video signals and other data with one another over a wired link. Video signals may, e.g., be acquired by an image sensor in a camera that is communicatively coupled to the transmitter. Furthermore, while this disclosure mainly describes video links and video signals, interferer removal as described herein is also applicable to image signals or any combination of video and image signals, transmitted over an analog transmission channel.

In one aspect of the present disclosure, a video system includes a video receiver for receiving a video signal transmitted in analog format over a video link. The video receiver includes an interferer identification circuit and an interferer removal circuit. The interferer identification circuit is configured to identify an interference signal (e.g., from one or more of vertical blanking intervals (VBIs)) of the received video signal. The interferer removal circuit is configured to generate a filtered video signal, where generation of the filtered video signal includes, for each line of a plurality of lines of a frame of the video signal, generating an adjusted interference signal by adjusting a phase of the identified interference signal to match a phase of a periodic noise signal in at least a portion of a horizontal blanking interval (HBI) associated with the line, and subtracting the adjusted interference signal from a plurality of active pixel values of the line. Such a video receiver may advantageously allow reducing or eliminating the impact of periodic interference signals that might affect the video signal during transmission, resulting in an improved quality of the video rendered at the receiver side.

Other aspects of the present disclosure provide methods for operating devices and systems described herein, as well as computer-readable storage media storing instructions which, when executed by a hardware processor, cause the processor to carry out the methods of using interferer removal to reduce the impact of periodic interference on analog transmission of video signals.

As will be appreciated by one skilled in the art, aspects of the present disclosure, in particular aspects of implementing interferer removal to reduce the impact of periodic interference on analog transmission of video signals as proposed herein, may be embodied in various manners—e.g. as a method, a system, a computer program product, or a computer-readable storage medium. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing video transmission systems, in particular, to the existing analog video transmission systems, including transmitters, receivers, and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The description may use the phrases "in an embodiment" or "in embodiments," which may each refer to one or more of the same or different embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner. Furthermore, for the purposes of the present disclosure, the phrase "A and/or B" or notation "A/B" means (A), (B), or (A and B), while the phrase "A, B, and/or C" means (A), (B), (C), (A and B), (A and C), (B and C), or (A, B, and C). As used herein, the notation "A/B/C" means (A, B, and/or C). The term "between," when used with reference to measurement ranges, is inclusive of the ends of the measurement ranges.

Various aspects of the illustrative embodiments are described using terms commonly employed by those skilled in the art to convey the substance of their work to others skilled in the art. For example, the term "connected" means a direct electrical connection between the things that are connected, without any intermediary devices/components, while the term "coupled" means either a direct electrical connection between the things that are connected, or an indirect connection through one or more passive or active intermediary devices/components. In another example, the term "circuit" means one or more passive and/or active components that are arranged to cooperate with one another to provide a desired function. Sometimes, in the present descriptions, the term "circuit" may be omitted (e.g., an "interferer identification circuit" may be referred to in the present descriptions as an "interferer identifier," etc.). If used, the terms "substantially," "approximately," "about," etc., may be used to generally refer to being within +/−20% of a target value, e.g., within +/−10% of a target value, based on the context of a particular value as described herein or as known in the art.

Other features and advantages of the disclosure will be apparent from the following description and the claims.

Analog Video Transmission

For purposes of illustrating interferer removal techniques, described herein, it might be useful to first understand phenomena that may come into play in analog video transmission. The following foundational information may be viewed as a basis from which the present disclosure may be properly explained. Such information is offered for purposes of explanation only and, accordingly, should not be construed in any way to limit the broad scope of the present disclosure and its potential applications.

In systems requiring the transfer of video data between system elements (e.g., between an image sensor and a processor implemented at a certain distance from the image sensor), such as surround view ADAS or (security) surveillance systems, the video data acquired by a camera can be transmitted in digital form, e.g., as a serialized digital bit stream, which can be, e.g., as RAW data as acquired by the image sensor or in some processed form, e.g., YUV data produced by an image system processor (ISP) performing de-mosaicking on the RAW image sensor data. Alternatively, the video data acquired by a camera may be formatted into an analog signal prior to transmission, and then transmitted in analog form.

Analog video signal transmission can be advantageous when contrasted to digital transmission. The serialized nature of digital transmission results in digital transmission requiring higher bandwidth than analog transmission. To satisfy the higher bandwidth requirement, more expensive infrastructure is required. Also, while bit accuracy is maintained in digital transmission and may be compromised in analog transmission, the impact of errors that do occur in a digital transmission can be much more impactful than those that occur in analog transmission in terms of the output video quality. Thus, transmitting the original digital video data as an analog signal offers several advantages over digital signal transmission. A system based around analog transmission may offer reduced cost and a more robust transmission. Thus, while the image sensor will generally output digital video data, this may be converted into an analog signal for transmission over an analog video link to a receiver for further processing.

Although well-known in the art, a brief explanation of example formatting of video data is provided below.

In a typical camera, color is produced by filtering the light hitting each photosite (or pixel) to produce either red, green or blue values. The arrangement for the different colors (i.e., color pattern) of the photosites most often used is a so-called "Bayer pattern." RAW data of a single image acquired by a camera (where a video is a sequence of images) like this represents the value of each pixel, for pixels of different colors. In other words, for a single image, RAW data may include pixel values for all red pixels (i.e., pixels configured to filter the incoming light to detect wavelengths in the spectrum associated with red color), pixel values for all green pixels (i.e., pixels configured to filter the incoming light to detect wavelengths in the spectrum associated with green color), and pixel values for all blue pixels (i.e., pixels configured to filter the incoming light to detect wavelengths in the spectrum associated with blue color). Each pixel may be characterized by, inter alia, an intensity or magnitude, and is represented by a number of bits (e.g., 10 bits) used to represent a magnitude of a signal acquired/stored in a particular pixel for a particular component.

RAW data may be processed to form components which are then transmitted in a video signal. For example, red, green, and blue values, or some processed version of those values, are one example of different components of an acquired image, together referred to as "RGB" color space. RAW data may interpolated, a process known as de-mosaicking, and then be transformed to other types of color spaces by an ISP, e.g., in "YUV" color spaces, where Y is a luminance component, carrying the intensity of light information, and U and V are chrominance components, carrying the color information. A video frame may be composed of a matrix of individual pixels of one or more components. In some embodiments, different components may be transmitted by different channels. Unless specified otherwise, descriptions provided herein may refer to pixel values of a certain component or any combination of components.

The pixel values of a video frame (the pixel values or pixels sometimes referred to as "active pixels" to indicate that they contain values representing a video frame as acquired by a camera) may be grouped into horizontal lines, referred to herein as "video lines," and these video lines may be grouped, or stacked, vertically to form a video frame. The screen is built up scanline by scanline, by sending the pixel values, represented by appropriate component values (e.g., RGB or YUV values), over the video link. However, only having a stream of components, e.g., a stream of RGB colors, is not sufficient to know which part of the stream belongs to a particular pixel (e.g., the top-left pixel) on a display. To solve this, two more signals are added to the video signal that contains the values of active pixels to be transmitted—one is a signal containing horizontal synchronization ("horizontal sync") pulses and another one is a signal containing vertical synchronization ("vertical sync") pulses. A horizontal sync pulse provides a reference for different video lines (i.e., it provides an indication of a start-of-line point), while a vertical sync pulse provides a reference for different video frames (i.e., it provides an indication of a start-of-frame point). A horizontal sync pulse (or, simply, "horizontal sync") may be a pulse inserted into a video signal before a stream with pixel values for a given video line begins or/and when a video line is done (but is typically inserted before a video line begins). Thus, the term "video line" refers to active pixel data (i.e., pixel values) for a line of a video frame, which data is included in a video signal in between two consecutive horizontal sync pulses. The two consecutive horizontal sync pulses may then be said as being "associated with" the video line. A vertical sync pulse (or, simply, "vertical sync," also sometimes referred to as a "vertical retrace") may be a pulse or sequence of pulses inserted into a video signal when all video lines of a given video frame have been completed or/and before video lines of a new video frame begin. Thus, each frame boundary may be demarcated by a single vertical sync pulse or sequence of pulses. Since each line of a frame has the same number of pixels, the time between consecutive horizontal sync pulses is constant. Since each full frame (i.e., a frame with all of its lines) has the same number of pixels, the time between consecutive vertical sync pulses is constant. In this manner, horizontal and vertical sync pulses allow determination of which color component of the video signal belongs to which position to be displayed on the screen. All common analog video transmission schemes mimic this organization of the pixels in a frame and mark the start-of-line and start-of-frame times with a horizontal sync and vertical sync pulses, respectively.

FIG. 1 illustrates a simplified example of an analog (video) signal showing how horizontal sync pulses 100 may be included into the video signal to be transmitted. As shown in FIG. 1, between each two consecutive horizontal sync pulses 100, active pixel data may be included, labeled in FIG. 1 as video lines 102 and 104 (i.e., portions of the video signal which carry the video data for two consecutive lines of a video frame). The pulses 100 are referred to as horizontal sync pulses due to the fact that they indicate the starting point for the active pixel values that would be rendered as a horizontal pixel line. Vertical synchronization lines (not shown in this example) indicate the beginning of a new video frame (within which the plurality of subsequent video lines, i.e., horizontal pixel (data) lines, will share a common vertical start point). Typically, but not necessarily, the horizontal sync pulses occupy the lowest portion of the signal range. A flat portion 106 immediately before a given horizontal sync pulse 100 is referred to as a "front porch" and a horizontal portion 108 immediately after the horizontal sync pulse is referred to as a "back porch", which portions may be set to certain predefined signal levels (e.g., both may be set to a zero voltage level) and may then be used to identify the horizontal sync pulses 100 within a video signal. Together, the front porch 106, the horizontal sync pulse 100 (which may include a series of pulses), and the back porch 108, are referred to as "horizontal blanking interval" (HBI). A VBI may be similar to the HBI in that it may include at least a vertical sync pulse (or a series of pulses) and at least one of a front porch or a back porch, except that the vertical sync pulse indicates the end of all video lines of a given video frame or/and the beginning of video lines of a new video frame.

Now turning to how video signals can be transmitted from a transmitter to a receiver, in implementing analog signal transmission over a wired transmission line, a choice can be made between Alternating Current (AC)- and Direct Current (DC)-coupling (the latter also referred to as "conductive coupling").

AC-coupling requires the use of at least one coupling capacitor, which is an additional component compared to DC-coupling where such capacitors are not required. An AC-coupled wired transmission line between a transmitter and receiver typically includes a first coupling capacitor, placed after the transmitter and prior to the transmission channel, and a second coupling capacitor, placed after the transmission channel and prior to the receiver. The term "coupling capacitor" as used herein may refer to one or more coupling capacitors. In contrast, in DC-coupling, only resistors or simply wire(s), and no coupling capacitors, are used and, therefore, DC-coupling may be favored due to its simpler implementation and lower cost and space requirements.

Furthermore, the coupling capacitor(s), together with the termination resistors at either end and with the impedance of the wired transmission cable, may act as a high-pass filter and, thus, may attenuate the transmission of lower frequency components of the analog signal. This is relevant to the transmission of video signals, as the frequency spectrum of such signals often includes DC level and low-frequency elements which would be vulnerable to such high-pass filtering, resulting in loss or distortion of picture information. Thus, it is desirable that a video signal can be preserved down to very low frequency and down to the DC level components. This means that coupling capacitor(s) used for AC-coupling may need to be sufficiently large in order to minimize the cutoff frequency of the high-pass filter formed with the receiver termination, and/or some other ingenious techniques are used.

While AC-coupling may be regarded as an undesirable option due to capacitor size requirements, it can be particularly advantageous in certain applications as it provides improved tolerance against some fault conditions. This is the case, for example, in automotive/vehicle applications, in which reducing the risk of damage during a short-to-battery (STB) fault condition may be a motivation for AC-coupled video links because, as they block DC voltage levels, AC-coupled links are intrinsically resistant to STB faults. Thus, transmitting video signals in an AC-coupled analog signal format can be a cost-effective and robust transmission option, particularly in automotive applications.

In various embodiments, interferer removal techniques as described herein may be used with either AC-coupled or DC-coupled analog transmission.

In some embodiments, interferer removal techniques as described herein may be implemented in systems that implement AC-coupled analog video transmission. In various embodiments, an AC-coupled transmission line for transfer of video data can be implemented according to either a single-ended or a differential-pair transmission scheme. In some implementations, differential-pair video transmission may be particularly advantageous as it may benefit from a stronger immunity to noise compared to single-ended video transmission.

In some embodiments of a single-ended implementation of an AC-coupled transmission line, a respective coupling capacitor may be placed in each of the two sides of a single-ended transmission line, i.e., one coupling capacitor between a transmitter and a conductor cable of the line, and another coupling capacitor between that conductor cable and a receiver. In some embodiments of a differential implementation of an AC-coupled transmission line, a respective pair of coupling capacitors may be placed in each of the two sides of a differential-pair transmission line, i.e., a pair of coupling capacitors between a transmitter and a conductor cable of the line, and another pair of coupling capacitors between that conductor cable and a receiver. In various embodiments, a conductor cable (or simply "cable") may be implemented in any suitable cabling scheme, e.g., as a single conductor (i.e., a conductor wire), as a coaxial cable, or as a dual conductor such as unshielded twisted pair (UTP) or STP (shielded twisted pair), depending on the transmission scheme used (i.e., depending on whether the transmission scheme is single-ended or differential). In some embodiments, the cable of a video transmission channel may include an RCA-type cable or a coaxial cable (which includes a signal wire at least partially enclosed within a shield of conductive material), or an unshielded AVSS, CIVUS or similar signal wire, within a shielded bundle.

Figure 2:
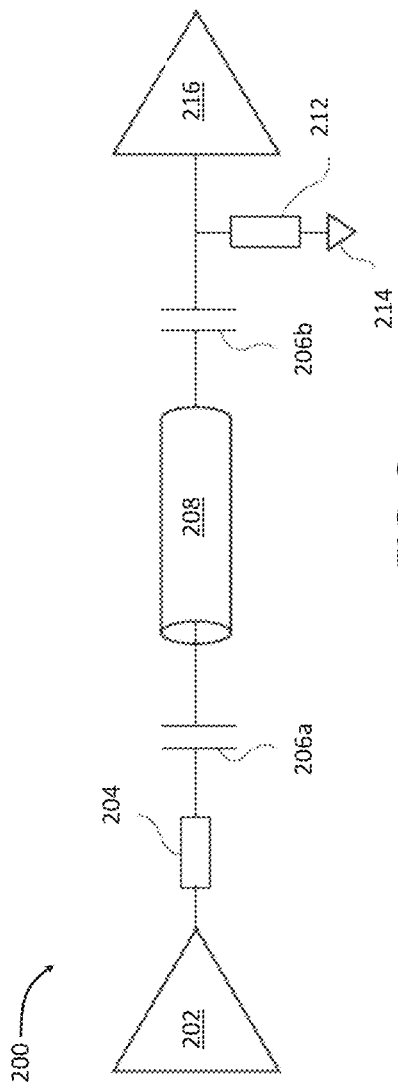
FIG. 2 provides a schematic illustration of an AC-coupled circuit in a single-ended transmission scheme, according to some embodiments of the present disclosure.
Figure 3:
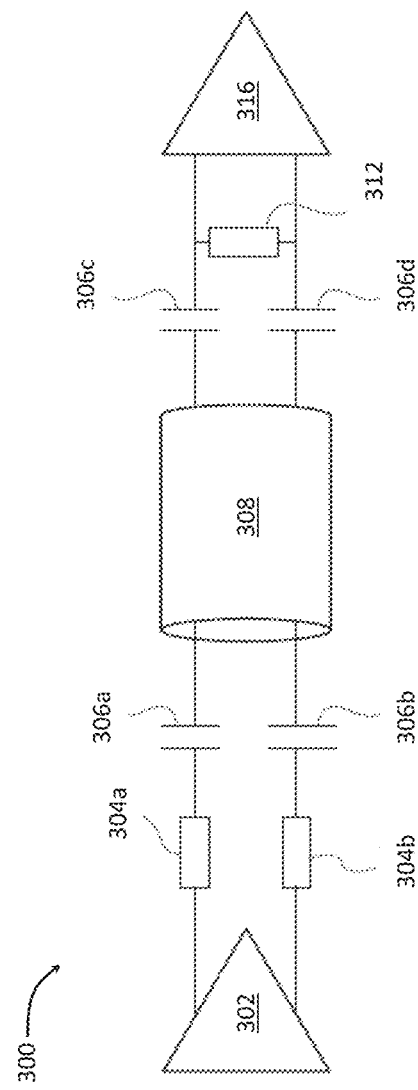
FIG. 3 provides a schematic illustration of an AC-coupled circuit in a differential transmission scheme, according to some embodiments of the present disclosure.

FIGS. 2 and 3 show schematic examples of a single-ended and a differential-pair transmission channels, respectively.

In an AC-coupled transmission scheme 200 shown in FIG. 2, a signal, which may comprise an analog-formatted video signal, is transmitted over a single conductor cable 208, which may be seen as a transmission channel 208. In some embodiments, the conductor cable 208 may include a simple conducting wire. In some embodiments, the conductor cable 208 may include a coaxial cable that includes a core conductive wire and a conductive shield, with the core wire carrying the video signal and the shield being grounded. Since the transmission scheme 200 is a single-ended signaling transmission scheme, only a first wire carries a varying voltage between the transmitter and receiver, while a second wire conductor (not shown in FIG. 2) may be connected to and carry a reference voltage signal (such as that provided by a ground reference 214 shown in FIG. 2). As shown in FIG. 2, the conductor cable 208 connects a transmitter 202 and a receiver 216. In this scheme, one or more coupling capacitors 206a, 206b may be connected between the transmitter 202 and receiver 216. In particular, one or more coupling capacitors 206a may be connected between the transmitter 202 and the conductor cable 208, and one or more coupling capacitors 206b may be connected between the conductor cable 208 and the receiver 216. The transmitter 202 may exhibit a total resistance 204 while the receiver 216 may exhibit a total resistance 212, which are in serial connection with the transmitter 202.

Alternatively, in an AC-coupled transmission scheme 300 shown in FIG. 3, a signal, which may comprise an analog-formatted video signal, is transmitted over a differential-pair conductor cable 308, which may be seen as a transmission channel 308. In some embodiments, the conductor cable 308 may include a UTP or an STP cable. While single-ended implementation can be advantageous due to its simpler implementation and lower cost, differential-pair signaling transmission schemes may advantageously offer resistance to external EMI and reduce the amount of electromagnetic emissions produced by the link. This is because the properties of the two separate signals/lines of the differential-pair of lines can be selected so as to provide cancellation of common mode interfering signals. As shown in FIG. 3, a transmitter 302, which may exhibit resistances 304a and 304b (serially connected to the transmitter 302) in the two lines of the differential-pair scheme, is connected to the conductor cable 308 via a pair of coupling capacitors 306a, 306b. Similarly, a receiver 316 is coupled to the conductor cable 308 via a resistance 312 (in parallel connection with the receiver 316) and a pair of coupling capacitors 306c, 306d.

Undesirable Effects of Periodic Interference Signals

Sometimes, noise signals may undesirably interfere with an analog video signal being transmitted from a transmitter to a receiver. The analog video signal is then said to be affected by such noise signals. In some deployment scenarios, the interference may be in a form of one or more periodic noise signals, e.g., a periodic EMI noise signal, which may be added to the video signal being transmitted. A schematic illustration of such a scenario is shown in FIG. 4.

Figure 4:
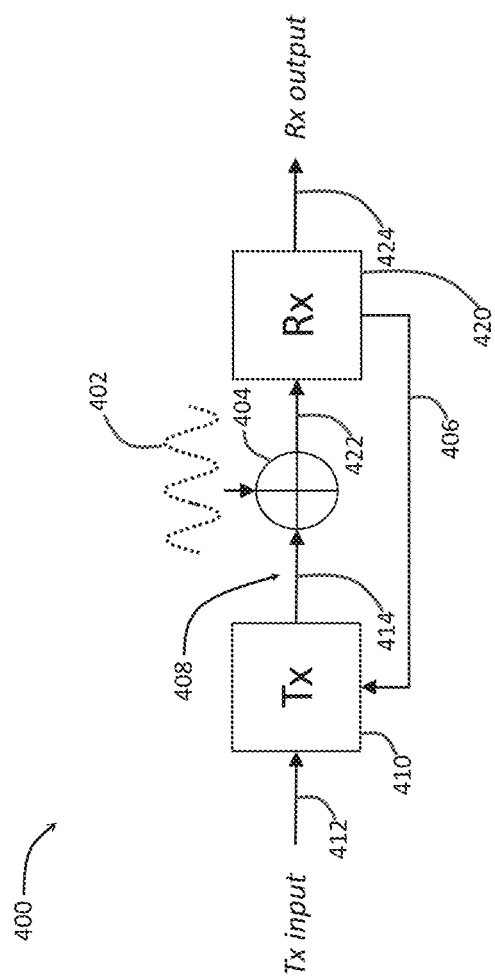
FIG. 4 provides a schematic illustration of a periodic interference noise signal affecting analog transmission of a video signal.

FIG. 4 illustrates a video system 400 that includes a video transmitter 410 and a video receiver 420. The transmitter 420 is configured to transmit a video signal to the receiver 420, over a cable 408. In some embodiments, the transmitter 410, the receiver 420, and the cable 408 may be implemented as, respectively, the transmitter 202, the receiver 216, and the cable 208 of FIG. 2. In other embodiments, the transmitter 410, the receiver 420, and the cable 408 may be implemented as, respectively, the transmitter 302, the receiver 316, and the cable 208 of FIG. 3. In some embodiments, the transmitter 410, the receiver 420, and the cable 408 may be implemented as, respectively, the transmitter 1310, the receiver 1320, and the cable 1330 of FIG. 13.

As shown in FIG. 4, the transmitter 410 may receive an input video signal, which may be referred to as a "Tx (transmit) input" 412, and, based on the Tx input 412, generate an output video signal, which may be referred to as a "Tx output" 414. The Tx output 414 is then being transmitted from the transmitter 410 to the receiver 420 over the cable 408. During the transmission, a periodic noise signal (or a plurality of periodic noise signals) may interfere with, and thereby affect, the Tx output 414. Such a noise signal is illustrated in FIG. 4 with a sinusoidal noise signal 402, although, in various embodiments of the present disclosure, the noise signal 402 may include any periodic signal that may interfere with the Tx output 414 as described herein. As is schematically illustrated in FIG. 4 with an adder 404, the noise signal 402 may effectively be added to, or superimposed on, the Tx output 414. As a result, an input video signal to the receiver 420, which may be referred to as a "Rx (receive) input" 422, includes a combination (e.g., a sum) of the Tx output 414 and the noise signal 402. The receiver 420 may be configured to process the Rx input 422 and, based on the Rx input 422, generate an output video signal, which may be referred to as a "Rx output" 424. The Rx output 424 may then be rendered on a display.

Figure 5:
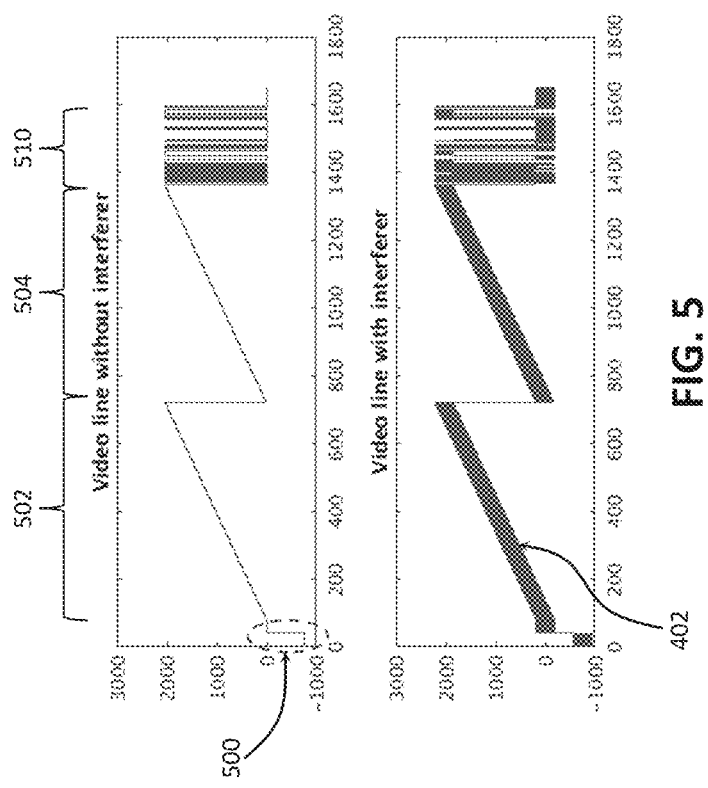
FIG. 5 provides example illustrations of a video line without and with a periodic interferer.
Figure 6:
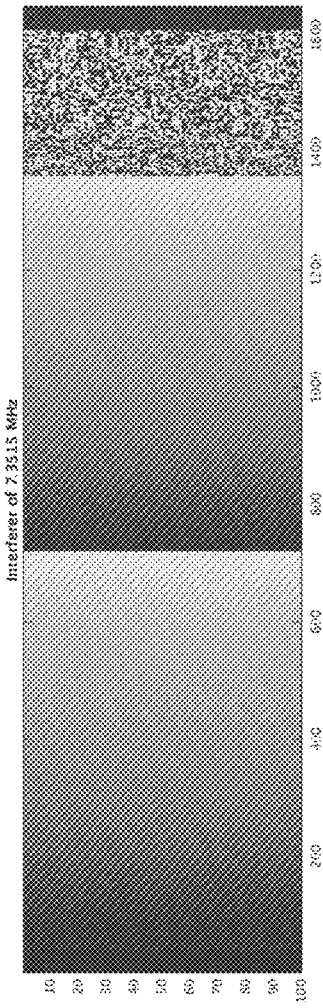
FIG. 6 provides an example illustration the effect of a periodic interferer on a video frame.

The noise signal 402 is a periodic interference signal that may be referred to herein as an interferer or a periodic interferer. Presence of the interferer 402 may be detectable in the video lines of a received video signal and may be visible when rendered on display, as illustrated in, respectively, FIGS. 5 and 6, thus compromising the integrity of the received video signal. FIG. 5 provides example illustrations of a video line without (shown in the top plot) and with (shown in the bottom plot) a periodic interferer. The horizontal axis of FIG. 5 illustrates time (or, seen differently, data samples), and the vertical axis illustrates example pixel values for an example video line. The top plot of FIG. 5 labels portions 500, 502, 504, and 510, which portions are also applicable to the bottom plot of FIG. 5. Portion 500 illustrates the horizontal sync pulse (similar to the horizontal sync pulse 100, shown in FIG. 1), portion 502 illustrates pixel values of a first component of a video line (e.g., pixel values of the red pixels for this video line), portion 504 illustrates pixel values of a second component of the same video line (e.g., pixel values of the blue pixels for this video line), and portion 510 illustrates control data associated with the video line. Thus, together, portions 502 and 504 illustrate active pixels for an example video line, similar to the active pixels of either the video line 102 or the video line 104, shown in FIG. 1. The bottom plot of FIG. 5 clearly illustrates that presence of an interferer blurs the active pixel values, which results in visible diagonal lines when a video frame with such interferer is rendered, as shown in FIG. 6, providing an example illustration the effect of a periodic interferer on a video frame.

Interferer Removal

Inventors of the present disclosure realized that, when the noise signal 402 is a periodic signal, it may be identified the received video signal (e.g., within one or more VBIs of the received video signal) and then removed or at least reduced in portions of the received video signal that contain active pixel data. To that end, inventors came up with a technique that may be referred to as "interferer removal," which technique may reduce or eliminate the detrimental effects of periodic interference/noise signals that may affect transmission of an analog video signal from a transmitter to a receiver.

Figure 7:
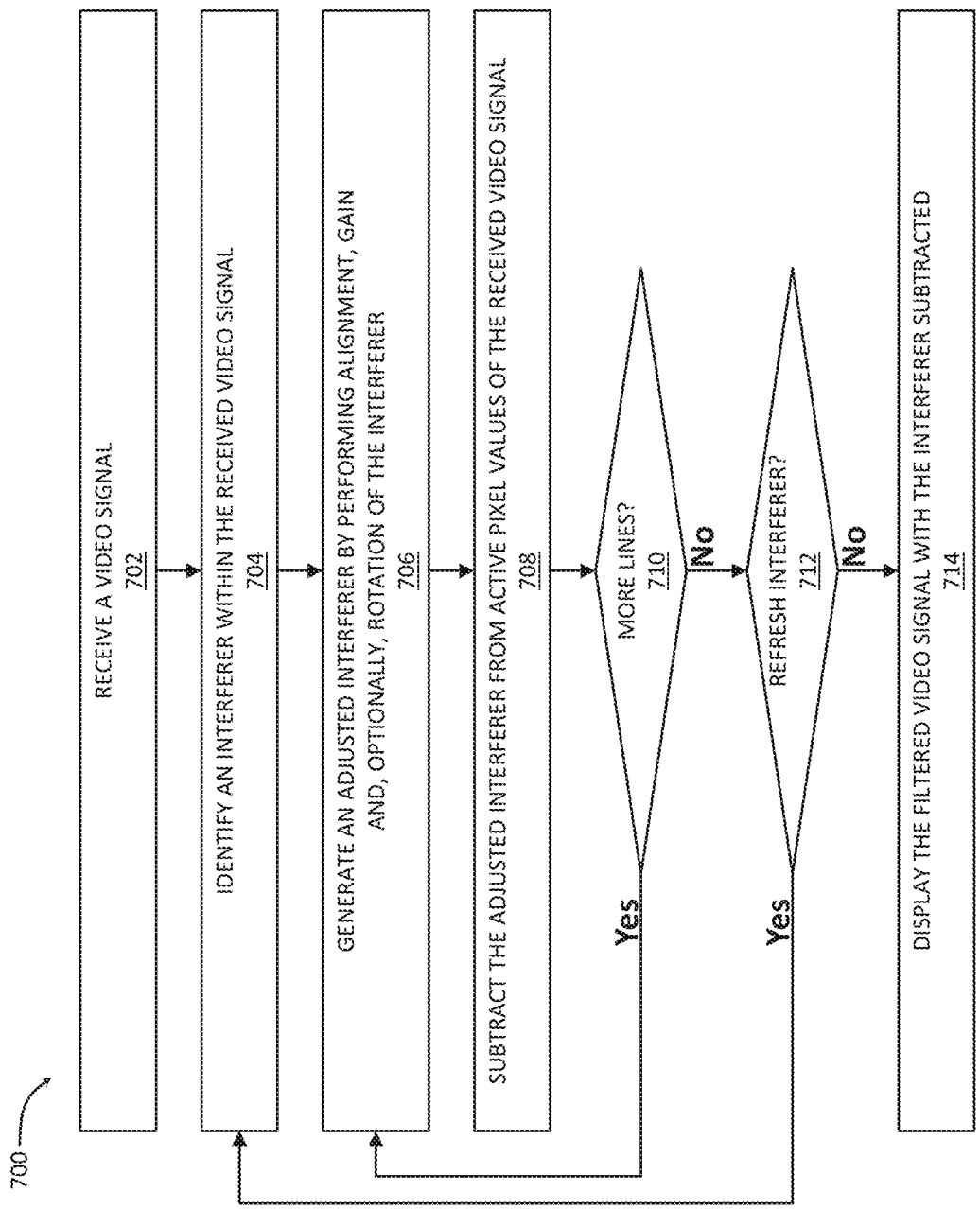
FIG. 7 provides a flowchart of an example method of operating a system, e.g., a video receiver, configured to implement an interferer removal technique to reduce the impact of periodic interference on analog transmission of video signals, according to some embodiments of the present disclosure.

FIG. 7 provides a flowchart of an example method 700 of operating a system, e.g., a video receiver, configured to implement an interferer removal technique to reduce the impact of periodic interference on analog transmission of video signals, according to some embodiments of the present disclosure. The method 700 can be implemented for any video system in which a video signal is acquired by a camera or generated in any other manner on the transmitting side and is transmitted in analog format, by a transmitter, to a receiver, over a wired link, to be processed, and possibly displayed on a display, on the receiving side (i.e., by the receiver). The method 700 will be illustrated with reference to the video system 400 shown in FIG. 4. However, in general, the method 700, in whole or in part, can be implemented using any other suitable video system comprising a video receiver configured to implement the interferer removal technique as described herein, for example, a receiver 1320 of a video system 1300 shown in FIG. 13, and/or a data processing system 1400 shown in FIG. 14, described below.

The method 700 may begin with step 702 where the receiver 420 (e.g., a receiving circuit of the receiver 420) receives a video signal transmitted by the transmitter 410 over an AC-coupled link (e.g., over the cable 408).

Next, in step 704, the receiver 420 (e.g., an interferer identification circuit of the receiver 420) may identify an interference signal (e.g., a periodic interference/noise signal) in the video signal received in step 702. In some embodiments, the receiver 420 may be configured to identify the interference signal by processing one or more portions of the received signal where the content is known to the receiver 420 ahead of time. There are several variations of what a "known content" included in the video signal prior to transmission over the AC-coupled channel may include. Some example variations will now be described, but, in general, any type of content that may be present in a video signal transmitted over the AC-coupled channel and that may be used by the receiver to identify the interference signal is within the scope of the present disclosure.

In some embodiments, the "known content" may include or be a certain number of pulses of constant or various amplitudes. In some embodiments, one or more of the synchronization pulses may serve as such "known content".

In other words, in such embodiments, the timing pulses (i.e., horizontal and/or vertical sync pulses) and/or their front or back porches can serve as reference levels once their positioning is determined within the received signal. For example, the receiver 420 may be configured to identify the interference signal from one or more VBIs of the received video signal.

In other embodiments, one or more additional pulses of constant or various amplitudes may be inserted into the video signal in addition to the active pixel values and the synchronization pulses, to provide the "known content" to be evaluated at the receiver in order to identify the interference signal.

In some embodiments, the "known content" may include known one or more lines deliberately inserted into the video signal, by the transmitter 410, prior to transmitting the video signal to the receiver 420. These lines may be referred to as (predefined) test lines and may, for example, simply include a flat level transmitted by the transmitter. In some embodiments, the test lines may alternate between high and low levels on subsequent video pixel lines. In some embodiments, the test lines may have differing average values, and in some embodiments the difference in average value of the test lines can be significant, which may be used to increase the magnitude of the error when compared to the known signal, improving the ability of the receiver 420 to accurately identify the interference signal. In some embodiments, the test line may include a plurality, for example four, wide-band pulses. In some embodiments, the four wide-band pulses may then be averaged in order to reduce noise before the receiver 420 attempts to identify the interference signal.

In some embodiments, a dedicated test line/pulse insertion module of the transmitter 410 may be used to insert the known content into a video signal prior to its transmission to the receiver 420. In some embodiments, the known content may be inserted in one or more VBIs between (adjacent) video frames. Alternatively or additionally, the one or more instances or portions of the known content may be periodically inserted into the digitized signal as a whole, prior to its' conversion to analog signal for transmission over the AC-coupled link. In some embodiments, the known content may be inserted following a predefined periodicity P, such that a new instance of the known content is inserted after, e.g., every 5 (or any other suitable number of) active video pixel lines. Such embodiments may advantageously enable control of the intensity of the monitoring effort by the receiver and can be selected to suit the needs of specific applications.

Provided that the known content is included in the video signal to be transmitted to the receiver 420, and provided that the receiver 420 has information indicating what the known content is and where it is to be found within the video signal, the receiver 420 may be configured to detect where this known content is positioned in the video signal received in step 702 (e.g., where the known content is positioned in a given frame of the video signal received in step 702). Based on the comparison of the known content detected in the received signal, or "extracted" from the received signal, and based on the receiver 420 having information as to what is expected to be in the known content, the receiver 420 can identify the interference signal in the received video signal. The interference signal identified in step 704 may be stored in an interferer buffer. For example, the interferer buffer may store amplitude values associated with a plurality of samples (e.g., about 300 samples) of the identified interference signal.

Once the interference signal has been identified, the receiver 420 may attempt to reduce or eliminate presence of the interference signal in the received video signal. To that end, the receiver 420 (e.g., an interferer removal circuit of the receiver 420) may be configured to process the video signal received in step 702 to generate a filtered video signal, where generation of the filtered video signal may include performing, on a line-by-line basis, steps 706 and 708, shown in FIG. 7. Step 706 may include the receiver 420 (e.g., the interferer removal circuit of the receiver 420) generating an adjusted interference signal by adjusting a phase of the interference signal identified in step 704 to match a phase of a periodic noise signal in at least a portion of an HBI associated with the line. Step 708 may include the receiver 420 (e.g., the interferer removal circuit of the receiver 420) subtracting the adjusted interference signal from a plurality of active pixel values of the line. In some embodiments, steps 706 and 708 may be performed for each line of a plurality of lines of a frame of the video signal received in step 702.

In some embodiments, step 706 may be similar to step 704 in that it includes the receiver 420 attempting to identify a periodic noise signal in a manner similar to how the receiver 420 identified the interference signal except that now the receiver 420 is configured to identify the periodic noise signal in values of the received signal associated with a single video line. To that end, the optimal portion of the received signal associated with a given video line for identifying such a noise signal may be at least a portion of the HBI associated with the line because that portion is expected to have known content. The periodic noise signal identified in step 706 may be stored in an alignment buffer. For example, the alignment buffer may store amplitude values associated with a plurality of samples (e.g., about 80 samples) of the periodic noise signal identified for a given line. FIG. 8 provides an example illustration of an alignment buffer, according to some embodiments of the present disclosure. In particular, FIG. 8 illustrates a plot 800 where the horizontal axis indicates data samples and the vertical axis indicates amplitude values (e.g., as output by an analog-to-digital converter of the receiver 420) for an example periodic noise signal identified in step 706 for a given line. On the other hand, FIG. 9 provides an example illustration of an interferer buffer, according to some embodiments of the present disclosure. FIG. 9 illustrates a plot 900 that is similar to the plot 800 in what is indicated on the horizontal and vertical axes, except that the plot 900 illustrates amplitude values for an example interference signal identified in step 704. It should be noted that, in general, the size of the alignment and interferer buffers may be different from what is shown in FIGS. 8 and 9, and also, the data values stored in the alignment and interferer buffers may only represent a portion of the periodic signals identified in steps 704 and 706, respectively. However, the plot 800 illustrating 80 data samples and the plot 900 illustrating 300 data samples is representative in that the periodic noise signal identified in step 706 is likely to have less data samples compared to the interference signal identified in step 704 because less data is available to identify a periodic noise signal for a given line than for an entire video signal. In some embodiments, the about 300 (or any other number) data samples of the interferer buffer may be a portion of the interference signal identified in step 704 that may be used for aligning the interference signal to the periodic noise signal identified in step 706.

Figure 10:
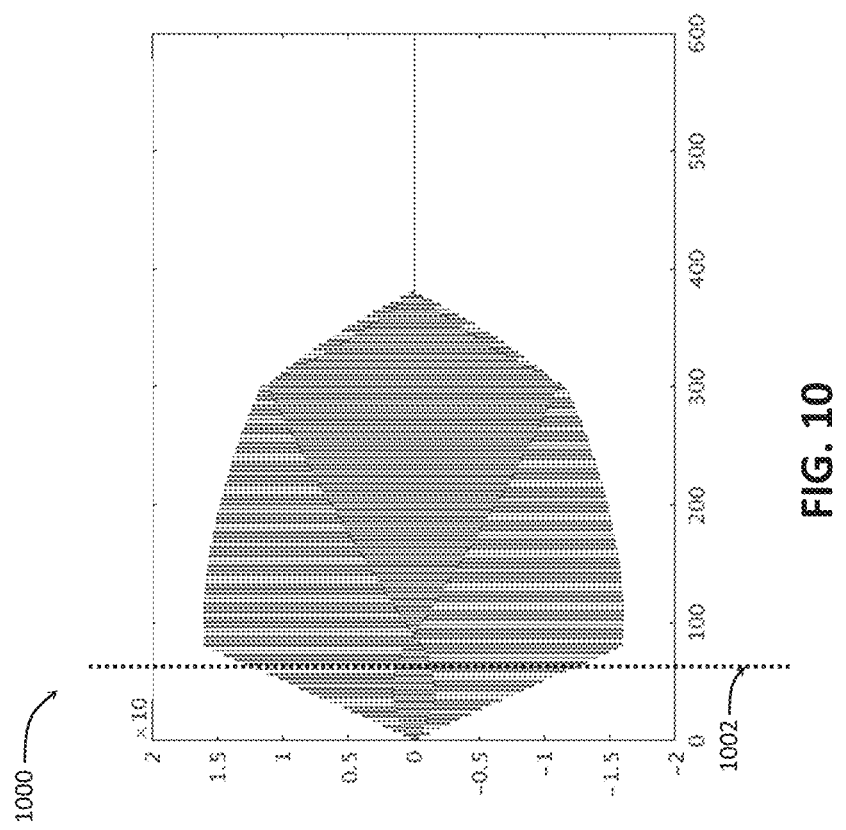
FIG. 10 provides an example illustration of cross-correlation of alignment and interferer buffers, according to some embodiments of the present disclosure.

Step 706 may further include the receiver 420 aligning the interference signal to the periodic noise signal identified for the line by adjusting a phase of the interference signal identified in step 704 to match a phase of the periodic noise signal identified in step 706. In some embodiments, alignment may include the receiver 420 performing a cross-correlation of the interference signal identified in step 704 and the periodic noise signal identified in step 706 (e.g., performing cross-correlation of the sequences of amplitude values stored in the alignment and the interferer buffers), and adjusting the phase of the interference signal based on a peak (e.g., a maximum) in the cross-correlation. For example, the peak may indicate at which data sample of the interference signal the interference signal is aligned (e.g., substantially overlaps in phase) with the periodic noise signal identified for the line in step 706, and the interference signal may then be modified to start at that data sample, so that the phase of the interference signal matches that of the periodic noise signal identified for the line in step 706. FIG. 10 provides an example illustration of a plot 1000 illustrating a cross-correlation function of alignment and interferer buffers, according to some embodiments of the present disclosure. The dotted line 1002 shown in FIG. 10 illustrates the maximum in the cross-correlation plot 1000, which happens at about data sample 80. The maximum in the cross-correlation also indicates the coarse alignment between the interferer signal and the alignment signal.

Figure 11:
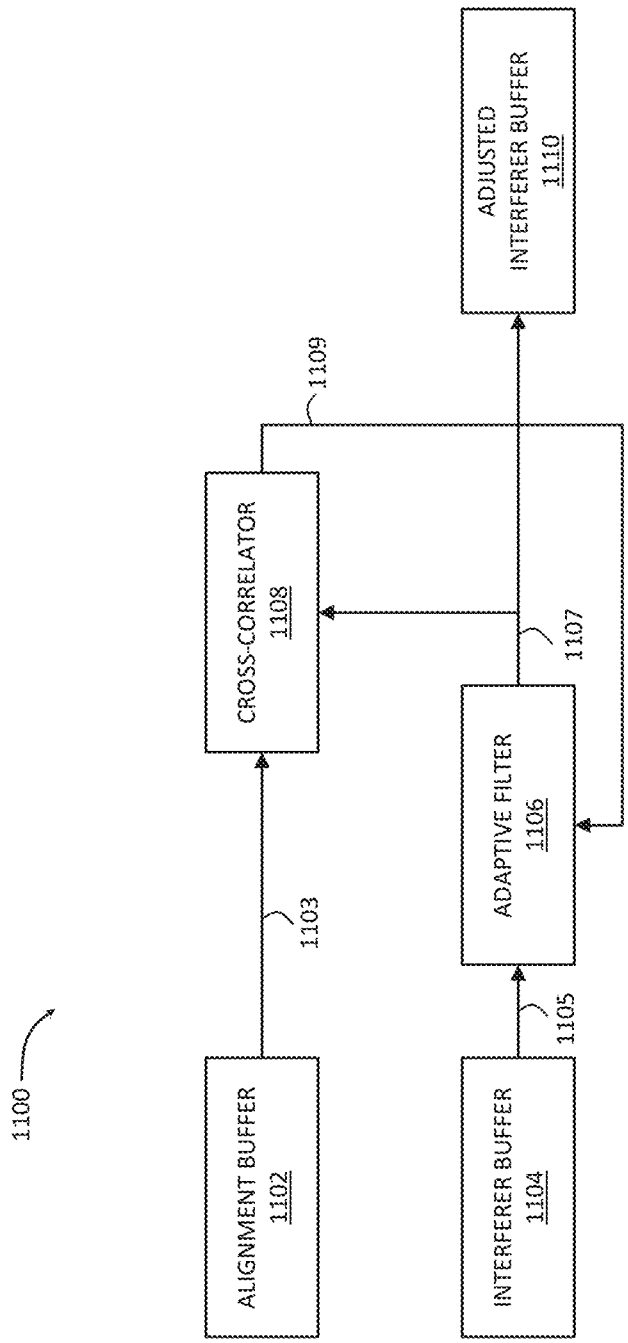
FIG. 11 is a schematic depiction of implementing an adaptive filter to align the interferer buffer and the alignment buffer, according to some embodiments of the present disclosure.

In some embodiments, adjusting the phase of the interference signal based on the peak in the cross-correlation may be the first step in that it performs a coarse adjustment of the phase, and may be followed up by a fine-tuning of the phase of the interference signal to align it with the periodic noise signal of the line. In some embodiments, fine-tuning of the phase may include the receiver 420 applying an adaptive filter to perform a fine adjustment of the phase of the identified interference signal. FIG. 11 is a schematic depiction of a system 1100, configured to implement an adaptive filter to align the interferer buffer and the alignment buffer, according to some embodiments of the present disclosure. Using an adaptive filter to fine-tune the phase alignments of the interference signal may be referred to as "rotation." The system 1100 may be a part of the receiver 420, e.g., a part of the interferer removal circuit of the receiver 420. As shown in FIG. 11, the system 1100 may include 3 buffers: an alignment buffer 1102, an interferer buffer 1104, and an adjusted interferer buffer 1110. The alignment buffer 1102 may be configured to store the periodic noise signal identified for a given line in step 706. The interferer buffer 1104 may be configured to store the interference signal identified in step 704. The adjusted interferer buffer 1110 may be configured to store the interference signal after it has been phase-adjusted to align with the data samples of the alignment buffer 1102. As shown in FIG. 11, a cross-correlator 1108 is configured to receive, from the alignment buffer 1102, a first buffer output 1103 that includes the periodic noise signal identified for a given line in step 706. An adaptive filter 1106 is configured to receive, from the interferer buffer 1104, a second buffer output 1105 that includes the interference signal identified in step 704. The adaptive filter 1106 is configured to phase shift the second buffer output 1105 to generate an adjusted interference signal 1107 that has been phase shifted with respect to the interference signal stored in the interferer buffer 1104. The adjusted interference signal 1107 is provided to the cross-correlator 1108. The cross-correlator 1108 is then configured to perform a cross-correlation of the first buffer output 1103 and the adjusted interference signal 1107 to generate a cross-correlation signal 1109 (e.g., a signal similar to that shown in FIG. 10), which is then provided to the adaptive filter 1106. The adaptive filter 1106 is then configured to adjust its parameters for performing the phase adjustment on the second buffer output 1105 based on the cross-correlation signal 1109. For example, the adaptive filter 1106 may be configured to adjust filter coefficients applied to the second buffer output 1105 to minimize a loss function indicative of a misalignment between the first buffer output 1103 and the adjusted interference signal 1107, with the cross-correlation signal 1109 being indicative of said misalignment. Thus, the filter 1106 is an adaptive filter meaning that the adjustment of filter coefficients that are responsible for phase-shifting of the interference signal 1105 is performed in an iterative process by gradually adjusting the coefficients based on a measure of misalignment as provided by the cross-correlation signal 1109. In some embodiments, the adaptive filter 1106 may be a least mean squares (LMS) filter, although in other embodiments other adaptive filters may be used. In some embodiments, the adaptive filter 1106 may have a filter order between 6 and 8, although in other embodiments other adaptive filters may be a filter of a different order. At some point (which may be either some predefined point in time, e.g., after a predefined number of iterations of the adaptive filter 1106, or after one or more criteria on the amount of misalignment is met), the adjusted interference signal 1107 is assumed to be sufficiently matched in phase to the first buffer output 1103, so that is it provided to the adjusted interferer buffer 1110.

It should be noted that FIG. 11 provides one non-limiting example of how various buffers may be used and how phase adjustment may be performed in step 706. In other embodiments, the adaptive filter 1106 may be implemented based on a feedback signal indicative of misalignment between data stored in the alignment buffer 1102 and the interferer buffer 1104 that is not necessarily the cross-correlation signal 1109 (i.e., the cross-correlator 1108 may be replaced with any other circuit configured to generate a signal 1109 that provides a measure of phase alignment of the signals stored in the alignment buffer 1102 and the interferer buffer 1104).

Figure 12:
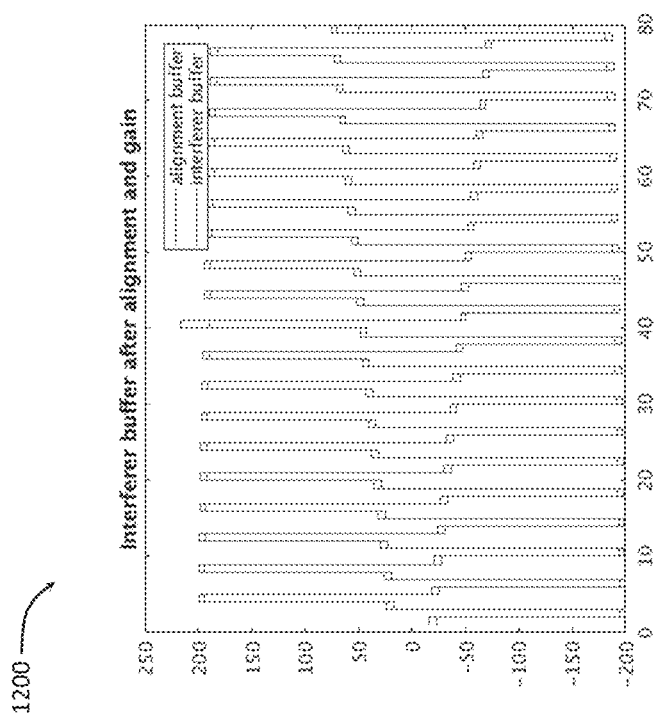
FIG. 12 provides an example illustration of an interferer buffer superimposed over an alignment buffer, after alignment and amplitude adjustment, according to some embodiments of the present disclosure.

In some embodiments, generation of the adjusted interference signal may further include adjusting an amplitude of the interference signal identified in step 704 to match an amplitude of the periodic noise signal identified in step 706. In this way, the contents of the alignment buffer 1102 and the adjusted interferer buffer 1110 may be normalized so that the values of the data samples in the adjusted interferer buffer 1110 is substantially equal to, e.g., within an acceptable margin, to the values of the data samples in the alignment buffer 1102. FIG. 12 provides an example illustration of an interferer buffer superimposed over an alignment buffer, after alignment (i.e., phase adjustment) and amplitude/gain adjustment have been performed, according to some embodiments of the present disclosure. FIG. 12 illustrates a plot 1200 similar to the plots 800 and 900, except that it shows both the data samples of the alignment buffer and of a portion of the adjusted interferer buffer that has the same number of data samples as those in the alignment buffer (80 samples for the example shown). As can be seen in FIG. 12, phase and amplitude adjustment allows aligning and normalizing the interference signal identified in step 704 to match the periodic noise signal identified for the line so that, in step 708, the adjusted interference signal may be subtracted from the plurality of active pixel values of the line to substantially remove, or at least reduce the presence/effect of the periodic interference signal in the active pixel values. In some embodiments, subtracting the adjusted interference signal from the active pixel values of the line includes, for each active pixel value (i.e., for each data sample of the video data) of the plurality of active pixel values of the line, subtracting a corresponding value of the adjusted interference signal.

The method 700 may further include step 710, in which the receiver 420 determines whether there are more lines for which steps 706 and 708 are to be repeated. For example, in some embodiments, the receiver 420 may use the interference signal identified in step 704 to generate a filtered video signal for all lines of a given frame, where the periodic noise signal is identified in step 706 on a per-line basis. If the receiver 420 determines in step 710 that there are more lines to be processed, then the method proceeds back to step 706 where steps 706, 708, and 710 are repeated for the next line, still using the same interference signal identified in step 704. If the receiver 420 determines in step 710 that there are no more lines to be processed (e.g., if all lines of a given frame have been processed), then the method proceeds to step 712, in which the receiver 420 determines whether the video signal needs to be filtered further with a new, refreshed, interferer. Periodic interference signals that may affect video transmission may change over time. Therefore, refreshing identification of the interference signal periodically or on some other basis advantageously allows identifying and correcting for the change in the interference. For example, in some embodiments, the receiver 420 may refresh the identification of the interference signal once per frame, e.g., in the beginning of each new frame. In other embodiments, the receiver 420 may refresh the interferer more or less often. If the receiver 420 determines in step 712 that the interferer is to be refreshed, then the method proceeds back to step 704 where steps 704, 706, 708, 710, and 712 are repeated for the new interference signal identified in step 704. If the receiver 420 determines in step 712 that there is no need to refresh the interferer, then the method 700 may proceed to step 714, in which the receiver 420 may display/render the filtered video signal (i.e., the received video signal from which the adjusted interference signals have been subtracted) on a display.

In some embodiments, the method 700 may be performed multiple times during transmission of a video signal from the transmitter 410 to the receiver 420, which may advantageously allow the video system 400 to adapt to possibly changing nature of the noise signal 402.

Although not specifically shown in FIG. 7, the method 700 may further include a step in which the receiver 420 (e.g., a processor of the receiver 420) generates a processed filtered video signal by processing the filtered video signal in preparation for rendering a video content of the filtered video signal on a display in step 714.

Example Video System

Figure 13:
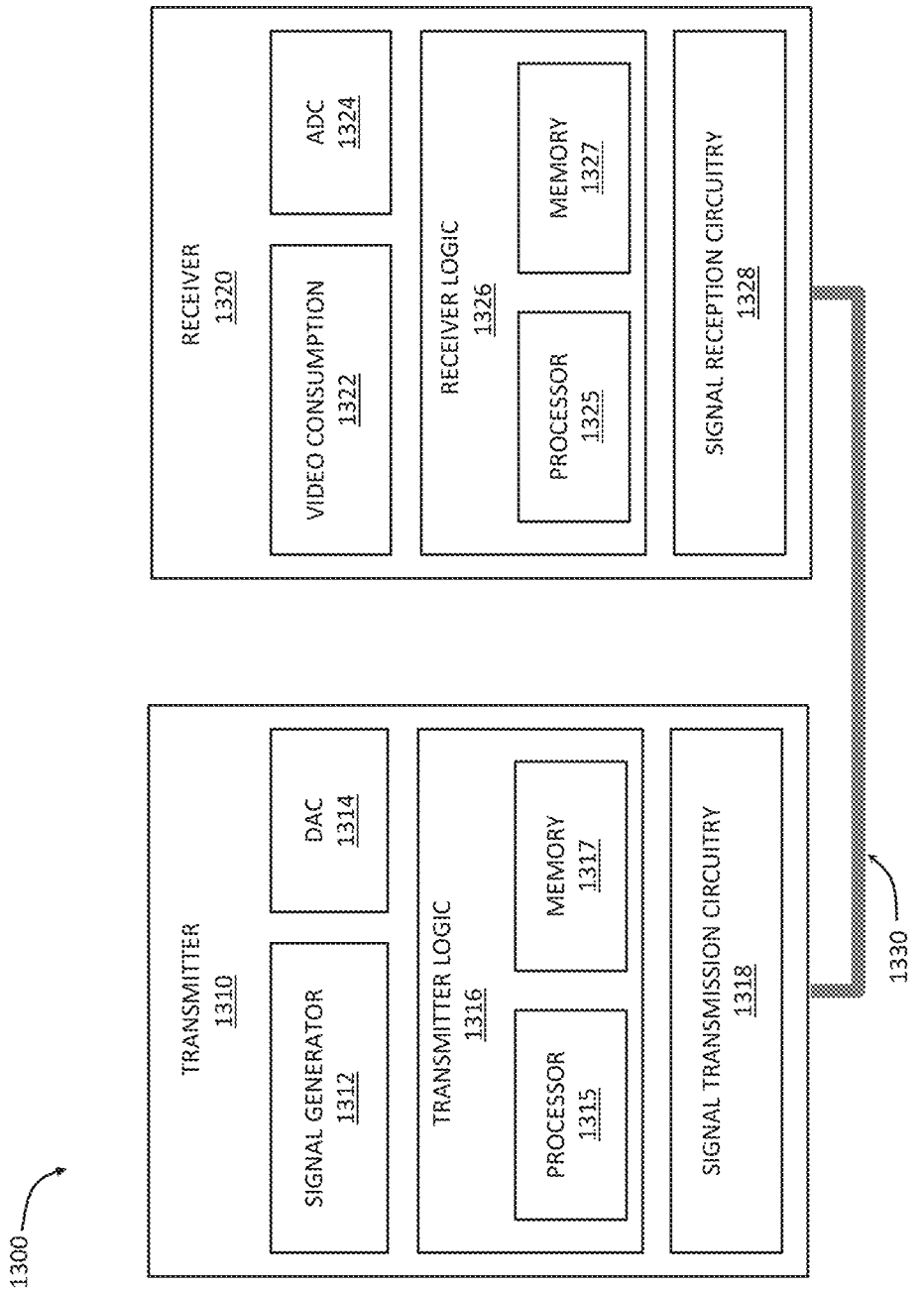
FIG. 13 provides a block diagram illustrating an example video system, according to some embodiments of the present disclosure.

FIG. 13 illustrates an example video system 1300, according to some embodiments of the present disclosure. As shown in FIG. 13, the example system 1300 may include a transmitter 1310 and a receiver 1320 coupled by an analog link 1330. The analog link 1330 may be any suitable wired conductor cable, e.g., the single-ended conductor cable 208 or the differential-pair cable 308, described above with reference to AC-coupled links. In other examples, the analog link 1330 may be an analog DC-coupled link. The transmitter 1310 may be the transmitter 410 and/or the receiver 1320 may be the receiver 420, described above.

As shown in FIG. 13, the transmitter 1310 may include, or be communicatively coupled to, a video signal generator 1312. The video signal generator 1312 may include any suitable means for generating a signal to be transmitted to the receiver 1320 over the analog link 1330. For example, in some embodiments, the video signal generator 1312 may include any suitable image sensor, ISP or camera (which may include a plurality of cameras) configured to acquire a video signal (which may include a plurality of video signals). In other embodiments, the signal generator 1312 may include means for producing a computer-generated video signal.

As further shown in FIG. 13, the transmitter 1310 may also include, or be communicatively coupled to, one or more digital-to-analog converters (DACs) 1314. As used herein, the term "DAC" refers to an electronic circuit/device that converts a digital value that represents an amplitude of a continuous physical quantity to a corresponding analog value. In some embodiments, the one or more DACs 1314 may be configured to receive a digital video signal comprising digital pixel values, and convert the digital values (i.e., discrete-time and discrete-amplitude values of the digital signal) to a continuous-time and continuous-amplitude analog signal. In some embodiments, the one or more DACs 1314 may be configured to convert a digital signal generated by the signal generator 1312, e.g., a digital video signal comprising digital pixel values as acquired by a camera. In other embodiments, the one or more DACs 1314 may be configured to convert a processed version of the digital signal generated by the signal generator 1312. Thus, the one or more DACs 1314 convert digitally processed signals to analog domain for analog transmission to the receiver 1320 over the analog link 1330.

In some embodiments, besides the one or more DACs 1314, the transmitter 1310 may include one or more analog-to-digital converters (ADCs) (not specifically shown in FIG. 13). As used herein, the term "ADC" refers to an electronic circuit/device that converts a continuous physical quantity carried by an analog signal to a digital number that represents the quantity's amplitude (or to a digital signal carrying that digital number). The result is a sequence of digital values (i.e., a digital signal) that has converted a continuous-time and continuous-amplitude analog input signal to a discrete-time and discrete-amplitude digital signal. Various converters included in the transmitter 1310 may operate by being provided with clock signals generated by a clock generator (not specifically shown in FIG. 13), e.g., under the control of the processor 1315.

As also shown in FIG. 13, the transmitter 1310 may further include, or be communicatively coupled to, transmitter logic 1316. The transmitter logic 1316 may be implemented in hardware, software, firmware, or any suitable combination of the one or more of these, and may be configured to control the operation of the transmitter 1310 as described herein. To that end, the transmitter logic 1316 may make use of at least one processor 1315 and at least one memory element 1317 along with any other suitable hardware and/or software to enable its intended functionality of assisting with interferer removal for a video signal transmitted over the analog link 1330, as described herein. In some embodiments, the processor 1315 can execute software or an algorithm to perform the activities as discussed in the present disclosure, e.g., the processor 1315 can execute the algorithms that control digital-to-analog conversion of signals generated by the signal generator 1312 for transmission over the analog transmission link 1330. Furthermore, the processor 1315 can execute algorithms that control generation and transmission of the Tx output 414 to the receiver 1320 as described herein. For example, in some embodiments when "known content" is deliberately added to the signal to be transmitted prior to signal transmission over the analog link 1330 for the purposes of interferer removal as described above, the processor 1315 may be configured to add such known content. The processor 1315 may also be configured to control transmission of the analog signal Tx output 414, to the receiver 1320, as described herein. Further descriptions of the processor 1315 and the memory element 1317 are provided below.

Also shown in FIG. 13 is that the transmitter 1310 may also include, or be communicatively coupled to, signal transmission circuitry 1318 for transmitting signals to the receiver 1320. In particular, the signal transmission circuitry 1318 may include components for enabling analog transmission of the analog video signal, e.g., as obtained from the DAC 1314 and processed by the transmitter logic 1316. In some embodiments, such components may include coupling capacitors, e.g., coupling capacitors on the transmitter side as described with reference to FIGS. 2 and 3, as well as any other circuitry as known in the art to be used for analog transmission of signals.

Turning to the receiving side of the video system 1300, as shown in FIG. 13, the receiver 1320 may include, or be communicatively coupled to, signal reception circuitry 1328, receiver logic 1326, an ADC 1324, and, optionally, a video consumption device 1322. The video consumption device 1322, may, in some embodiments, be a video processing device such as an ISP, a video analysis device, such as an ADAS processor, or a video rendering device such as a display.

The signal reception circuitry 1328 may be configured to receive signals from the transmitter 1310. In particular, the signal reception circuitry 1328 may include components for enabling receipt of AC- or DC-coupled transmission of the analog video signal, e.g., to be provided to the ADC 1324 for conversion to digital and to be provided to the receiver logic 1326 for further processing, possibly after conversion by the ADC 1324. In some embodiments, components for enabling receipt of AC- or DC-coupled transmission of the analog video signal may include coupling capacitors, e.g., coupling capacitors on the receiver side as described with reference to FIGS. 2 and 3, as well as any other circuitry as known in the art to be used for reception of analog signals. In addition, the signal reception circuitry 1328 may further include components for enabling receipt of other information from the transmitter 1310.

As shown in FIG. 13, the receiver 1320 may also include one or more ADCs 1324. In case of the ADC 1324 used in the video system 1300, the analog input signal being converted may be the video signal transmitted from the transmitter 1310 over the analog video link 1330 and received by the signal reception circuitry 1328, e.g., to be further processed in digital form by the receiver logic 1326. In some embodiments, the receiver 1320 may further include one or more DACs (not specifically shown in FIG. 13). Various converters included in the receiver 1320 may operate by being provided with clock signals generated by a clock generator (not specifically shown in FIG. 13), e.g., under the control of the processor 1325.

Similar to the transmitter logic 1316, the receiver logic 1326 may be implemented in hardware, software, firmware, or any suitable combination of the one or more of these, and may be configured to control the operation of the receiver 1320, as described herein. To that end, the receiver logic 1326 may make use of at least one processor 1325 and at least one memory element 1327 along with any other suitable hardware and/or software to enable its intended functionality of interferer removal as described herein. In some embodiments, the processor 1325 can execute software or an algorithm to perform the activities as discussed in the present disclosure, e.g., the processor 1325 can execute the algorithms that control analog-to-digital conversion of signals received by the signal reception circuitry 1328 after having been transmitted over the analog transmission link 1330. Furthermore, the processor 1325 can execute algorithms that control identification of interference signals in step 704 of the method 700, identification of periodic noise signals on a per-line basis and generation of adjusted interference signals in step 706 of the method 700, subtraction of the adjusted interference signals in step 708 of the method 700, and so on, as described herein. The processor 1325 may be configured to implement interfere removal in described herein by processing received video signals in the digital form, e.g., as converted by the one or more ADCs 1324. Further descriptions of the processor 1325 and the memory element 1327 are provided below.

Each of the processors 1315, 1325 may be configured to communicatively couple to other system elements via one or more interconnects or buses. Such a processor may include any combination of hardware, software, or firmware providing programmable logic, including by way of non-limiting example a microprocessor, a digital signal processor (DSP), a field-programmable gate array (FPGA), a programmable logic array (PLA), an application specific integrated circuit (IC) (ASIC), or a virtual machine processor. The processor 1315 may be communicatively coupled to the memory element 1317, while the processor 1325 may be communicatively coupled to the memory element 1327, for example in a direct-memory access (DMA) configuration. Each of the memory elements 1317, 1327 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory items discussed herein should be construed as being encompassed within the broad term "memory element."

The information being tracked or sent to the one or more components/elements of the transmitter 1310 and of the receiver 1320 could be provided and/or stored in any database, register, control list, cache, or storage structure, all of which can be referenced at any suitable timeframe. Any such storage options may be included within the broad term "memory element" as used herein and may be used to implement the memory element 1317 and/or memory element 1327. Similarly, any of the potential processing elements, modules, and machines described herein should be construed as being encompassed within the broad term "processor" as used herein and may be used to implement the processor 1315 and/or the processor 1325. Each of the elements shown in FIG. 13, e.g., the signal generator 1312, the DAC 1314, the transmitter logic 1316, the video consumption 1322, the ADC 1324, or the receiver logic 1326, can also include suitable interfaces for receiving, transmitting, and/or otherwise communicating data or information in a network environment, either over wired or a wireless communications link.

In certain example implementations, mechanisms for interferer removal to reduce the impact of periodic interference on analog transmission of video signals as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g., the memory elements 1317 and 1327 shown in FIG. 13, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g., the processors 1315 and 1325 shown in FIG. 13, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable ROM, an electrically erasable programmable ROM) or an ASIC that includes digital logic, software, code, electronic instructions, or any suitable combination thereof.

Example Data Processing System

Figure 14:
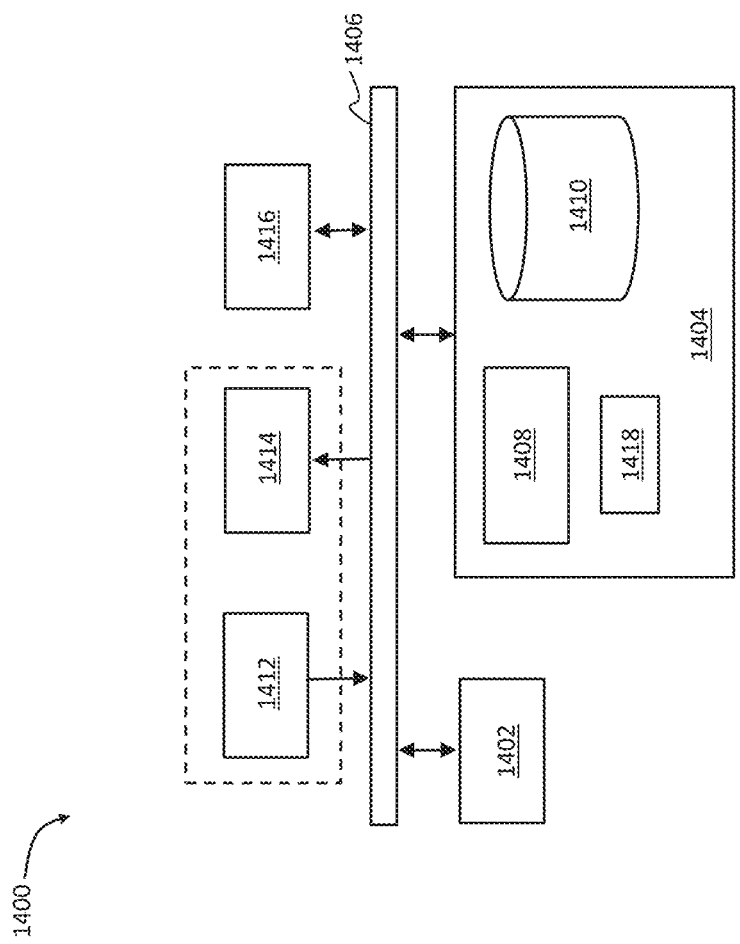
FIG. 14 provides a block diagram illustrating an example data processing system, according to some embodiments of the present disclosure.

FIG. 14 provides a block diagram illustrating an example data processing system for implementing at least portions of interferer removal to reduce the impact of periodic interference signals on analog transmission of video signals as disclosed herein, according to some embodiments of the present disclosure. Such a data processing system could be configured to, e.g., function as the transmitter logic 1316 and/or as the receiver logic 1326 described herein or as any other system configured to implement various improved mechanisms related to interferer removal as disclosed herein.

As shown in FIG. 14, the data processing system 1400 may include at least one processor 1402 coupled to memory elements 1404 through a system bus 1406. As such, the data processing system may store program code within memory elements 1404. Further, the processor 1402 may execute the program code accessed from the memory elements 1404 via a system bus 1406. In one aspect, the data processing system may be implemented as a computer that is suitable for storing and/or executing program code. It should be appreciated, however, that the data processing system 1400 may be implemented in the form of any system including a processor and a memory that is capable of performing the functions described within the present disclosure.

In some embodiments, the processor 1402 may be the processor 1315 and the memory elements 1404 may be the memory elements 1317 of the transmitter 1310 of the video system 1300 shown in FIG. 13, as described above. In some embodiments, the processor 1402 may be the processor 1325 and the memory elements 1404 may be the memory elements 1327 of the receiver 1320 of the video system 1300 shown in FIG. 13, as described above.

The memory elements 1404 may include one or more physical memory devices such as, for example, local memory 1408 and one or more bulk storage devices 1410. The local memory may refer to RAM or other non-persistent memory device(s) generally used during actual execution of the program code. A bulk storage device may be implemented as a hard drive or other persistent data storage device. The processing system 1400 may also include one or more cache memories (not shown) that provide temporary storage of at least some program code in order to reduce the number of times program code must be retrieved from the bulk storage device 1410 during execution.

Input/output (I/O) devices depicted as an input device 1412 and an output device 1414, optionally, can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 14 with a dashed line surrounding the input device 1412 and the output device 1414). An example of such a combined device is a touch sensitive display, also sometimes referred to as a "touch screen display" or simply "touch screen". In such an embodiment, input to the device may be provided by a movement of a physical object, such as e.g., a stylus or a finger of a user, on or near the touch screen display.

When used in a video system according to various embodiments of the present disclosure, e.g. in the video system 1300 shown in FIG. 13, the input device 1412 may be used to receive input, e.g., as provided by a user, and to configure the video system 1300 in accordance with the user input. For example, the input received by the input device 1412 may configure the receiver 1320 to enable or disable interferer removal, and/or modify various parameters of performing interferer removal (e.g., to modify how often the interferer is refreshed).

A network adapter 1416 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 1400, and a data transmitter for transmitting data from the data processing system 1400 to said systems, devices and/or networks. Modems, cable modems, and Ethernet cards are examples of different types of network adapter that may be used with the data processing system 1400.

When used in a video system according to various embodiments of the present disclosure, e.g. in the video system 1300 shown in FIG. 13, the network adapter 1416 may be used to receive input from other systems, computer systems, remote network devices, and/or remote storage devices through intervening private or public networks, and to configure the video system 1300 in accordance with the received input. For example, the network adapter 1416 may be configured to receive examples of input as described with reference to the input received by the input device 1412 from the user, except that now it would be received from other systems, computer systems, remote network devices, and/or remote storage devices through intervening private or public networks. The transmitter 1310 and the receiver 1320 of the video system 1300 may then be configured in accordance with the input received by the network adapter 1416, e.g., configured to enable or disable interferer removal as described herein.

As pictured in FIG. 14, the memory elements 1404 may store an application 1418. In various embodiments, the application 1418 may be stored in the local memory 1408, the one or more bulk storage devices 1410, or apart from the local memory and the bulk storage devices. It should be appreciated that the data processing system 1400 may further execute an operating system (not shown in FIG. 14) that can facilitate execution of the application 1418. The application 1418, being implemented in the form of executable program code, can be executed by the data processing system 1400, e.g., by the processor 1402. Responsive to executing the application, the data processing system 1400 may be configured to perform one or more operations or method steps described herein.

Select Examples

The following paragraphs provide various examples of the embodiments disclosed herein.

Example 1 provides a video receiver for receiving a video signal transmitted in analog format over a video link. The video receiver includes an interferer identification circuit, configured to identify an interference signal (e.g., a periodic interference/noise signal) from one of VBIs of the received video signal; and an interferer removal circuit, configured to generate a filtered video signal, where generation of the filtered video signal includes, for each line of a plurality of lines of a frame of the video signal, generating an adjusted interference signal by adjusting a phase of the identified interference signal to match a phase of a periodic noise signal in at least a portion of an HBI associated with the line, and subtracting the adjusted interference signal from a plurality of active pixel values of the line.

Example 2 provides the video receiver according to example 1, where subtracting the adjusted interference signal includes, for each active pixel value (i.e., for each data sample of the video data) of the plurality of active pixel values of the line, subtracting a corresponding value of the adjusted interference signal.

Example 3 provides the video receiver according to examples 1 or 2, where generating the adjusted interference signal further includes adjusting an amplitude of the identified interference signal to match an amplitude of the periodic noise signal in the HBI associated with the line.

Example 4 provides the video receiver according to any one of the preceding examples, where adjusting the phase includes performing a cross-correlation of the identified interference signal and the periodic noise signal in the HBI associated with the line, and adjusting the phase based on a peak (e.g., a maximum) in the cross-correlation.

Example 5 provides the video receiver according to example 4, where adjusting the phase further includes, after adjusting the phase based on the peak in the cross-correlation, applying an adaptive filter to perform a fine adjustment of the phase of the identified interference signal.

Example 6 provides the video receiver according to example 5, where a filter order of the adaptive filter is between 6 and 8. In other examples, the filter order may be different.

Example 7 provides the video receiver according to examples 5 or 6, where the adaptive filter is an LMS filter.

Example 8 provides the video receiver according to any one of the preceding examples, further including one or more of a buffer for storing the interference signal, a buffer for storing the adjusted interference signal, and a buffer for storing the noise signal.

Example 9 provides the video receiver according to any one of the preceding examples, further including a processor, configured to generate a processed filtered video signal by processing the filtered video signal in preparation for rendering a video content of the filtered video signal on a display.

Example 10 provides the video receiver according to any one of the preceding examples, further including a display, configured to display a video content of the filtered video signal.

Example 11 provides a video system that includes a transmitter and a receiver. The transmitter includes one or more circuits configured to transmit a video signal over a video link. The receiver includes one or more circuits configured to receive the video signal transmitted by the transmitter, identify a first interference signal (e.g., a periodic interference/noise signal) from a first portion of the received video signal, identify a second interference signal (e.g., a periodic interference/noise signal) from a second portion of the received video signal, different from the first portion, generate an adjusted first interference signal by adjusting a phase of the first interference signal based on a phase of the second interference signal, and subtract the adjusted first interference signal from a plurality of active pixel values of a portion of the video signal.

Example 12 provides the video system according to example 11, where the second portion of the video signal is a portion of an HBI associated with a video line of a frame of the video signal, and subtracting the adjusted first interference signal from the plurality of active pixel values of the portion of the video signal includes subtracting the adjusted first interference signal from a plurality of active pixel values of the video line.

Example 13 provides the video system according to example 12, where the one or more circuits of the receiver are configured to repeat identifying the second interference signal, generating the adjusted first interference signal, and subtracting the adjusted first interference signal for each of a plurality of video lines of the video signal.

Example 14 provides the video system according to example 13, where the plurality of video lines of the video signal includes video lines of a single frame.

Example 15 provides the video system according to any one of examples 11-14, where the one or more circuits of the receiver are configured to repeat identifying the first interference signal for each of a plurality of frames of the video signal.

Example 16 provides the video system according to example 15, where the one or more circuits of the receiver are configured to repeat identifying the second interference signal, generating the adjusted first interference signal, and subtracting the adjusted first interference signal for each video line of a plurality of video lines of each of the plurality of frames of the video signal.

Example 17 provides the video system according to any one of examples 11-16, where generating the adjusted first interference signal further includes adjusting a magnitude of the first interference signal based on a magnitude of the second interference signal.

Example 18 provides the video system according to any one of examples 11-17, where the first portion of the received video signal includes one or more VBIs of the received video signal.

Example 19 provides a non-transitory computer-readable storage medium, storing instructions which, when executed on a processor, cause the processor to identify a first interference signal (e.g., a periodic interference/noise signal) from a first portion of a received video signal received over an analog transmission link; identify a second interference signal (e.g., a periodic interference/noise signal) from a second portion of the received video signal, different from the first portion; generate an adjusted first interference signal by adjusting a phase of the first interference signal based on a phase of the second interference signal; and subtract the adjusted first interference signal from a plurality of active pixel values of a portion of the video signal.

Example 20 provides the non-transitory computer-readable storage medium according to example 19, where the first portion of the received video signal is a portion of one of VBIs of the received video signal, the second portion of the video signal is a portion of one of HBIs of the received video signal, and the instructions further cause the processor to repeat identifying the first interference signal for each of a plurality of frames of the video signal, and repeat identifying the second interference signal, generating the adjusted first interference signal, and subtracting the adjusted first interference signal for each of a plurality of video lines of each of the plurality of frames of the video signal.

Any one of the system, the transmitter, the receiver, and the method of any one of the preceding examples may be implemented in a vehicle or in a surveillance system. Furthermore, any one of the system, the transmitter, the receiver, and the method of any one of the preceding examples may include, or be communicatively coupled/connected to a camera configured to acquire the video signal to be transmitted over an analog transmission link, e.g., over an AC-coupled link, where the camera may include a plurality of optical sensors (e.g., photodiodes) configured to generate pixel values of the video signal to be transmitted over the link.

Other Implementation Notes, Variations, and Applications

Principles and advantages discussed herein can be used in any device or system where video or image data is transmitted over an analog transmission link and where one or more periodic noise signals may interfere with the transmission. It is to be understood that not necessarily all objects or advantages mentioned herein may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the present drawings may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present drawings may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, some components, e.g., digital filters, may be implemented in one or more silicon cores in Application Specific Integrated Circuits (ASICs), FPGAs, and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be distributed or consolidated in any suitable manner. Along similar design alternatives, any of the illustrated components, modules, and elements of the present drawings may be combined in various possible configurations, all of which are clearly within the broad scope of the present disclosure. In certain cases, it may be easier to describe one or more of the functionalities of a given set of flows by only referencing a limited number of electrical elements. It should be appreciated that the electrical circuits of the figures and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in the present disclosure references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to interferer removal to reduce the impact of periodic interference signals on analog transmission of video signals, e.g. those summarized in the one or more processes shown in FIGS. 7 and 11, illustrate only some of the possible functions that may be executed by, or within, the systems illustrated in the present drawings, e.g. the systems shown in FIG. 4, 13, or 14. Some of these operations may be deleted or removed where appropriate, or these operations may be modified or changed considerably without departing from the scope of the present disclosure. In addition, the timing of these operations may be altered considerably. The preceding operational flows, e.g., as shown in FIGS. 7 and 11, have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of any of the apparatus, device, or system described above may also be implemented with respect to the method or processes of using or operating said apparatus device, or system, and specifics in the examples provided for any of the apparatus, device, or system described herein may be used anywhere in corresponding methods or processes, and vice versa.

The invention claimed is:

1. A video receiver for receiving a video signal transmitted in analog format over a video link, the video receiver comprising:
    an interferer identification circuit to identify an interference signal from one of vertical blanking intervals (VBIs) of the video signal; and
    an interferer removal circuit to generate a filtered video signal, wherein generation of the filtered video signal includes, for each line of a plurality of lines of a frame of the video signal:
        generating an adjusted interference signal by adjusting a phase of the interference signal to match a phase of a noise signal in at least a portion of a horizontal blanking interval (HBI) associated with the line, and
        subtracting the adjusted interference signal from a plurality of active pixel values of the line.

2. The video receiver according to claim 1, wherein subtracting the adjusted interference signal includes, for each active pixel value of the plurality of active pixel values of the line, subtracting a corresponding value of the adjusted interference signal.

3. The video receiver according to claim 1, wherein generating the adjusted interference signal further includes adjusting an amplitude of the interference signal to match an amplitude of the noise signal in the HBI associated with the line.

4. The video receiver according to claim 1, wherein adjusting the phase includes:
    performing a cross-correlation of the interference signal and the noise signal in the HBI associated with the line, and
    adjusting the phase based on a peak in the cross-correlation.

5. The video receiver according to claim 4, wherein adjusting the phase further includes, after adjusting the phase based on the peak in the cross-correlation, applying an adaptive filter to perform a fine adjustment of the phase of the interference signal.

6. The video receiver according to claim 5, wherein a filter order of the adaptive filter is between 6 and 8.

7. The video receiver according to claim 5, wherein the adaptive filter is a least mean squares (LMS) filter.

8. The video receiver according to claim 1, further comprising one or more of:
    a buffer for storing the interference signal,
    a buffer for storing the adjusted interference signal, and
    a buffer for storing the noise signal.

9. The video receiver according to claim 1, further comprising a processor to generate a processed filtered video signal by processing the filtered video signal in preparation for rendering a video content of the filtered video signal on a display.

10. The video receiver according to claim 1, further comprising a display to display a video content of the filtered video signal.

11. A video system, comprising:
    a transmitter, comprising one or more circuits to transmit a video signal over a video link;
    a receiver, comprising one or more circuits to:
        receive the video signal transmitted by the transmitter,
        identify a first interference signal from a first portion of the video signal,
        identify a second interference signal from a second portion of the video signal, different from the first portion,
        generate an adjusted first interference signal by adjusting a phase of the first interference signal based on a phase of the second interference signal, and
        subtract the adjusted first interference signal from a plurality of active pixel values of a portion of the video signal.

12. The video system according to claim 11, wherein:
    the second portion of the video signal is a portion of a horizontal blanking interval (HBI) associated with a video line of a frame of the video signal, and
    subtracting the adjusted first interference signal from the plurality of active pixel values of the portion of the video signal includes subtracting the adjusted first interference signal from a plurality of active pixel values of the video line.

13. The video system according to claim 12, wherein the one or more circuits of the receiver are to repeat identifying the second interference signal, generating the adjusted first interference signal, and subtracting the adjusted first interference signal for each of a plurality of video lines of the video signal.

14. The video system according to claim 13, wherein the plurality of video lines of the video signal includes video lines of a single frame.

15. The video system according to claim 11, wherein the one or more circuits of the receiver are to repeat identifying the first interference signal for each of a plurality of frames of the video signal.

16. The video system according to claim 15, wherein the one or more circuits of the receiver are to repeat identifying the second interference signal, generating the adjusted first interference signal, and subtracting the adjusted first interference signal for each video line of a plurality of video lines of each of the plurality of frames of the video signal.

17. The video system according to claim 11, wherein generating the adjusted first interference signal further includes adjusting a magnitude of the first interference signal based on a magnitude of the second interference signal.

18. The video system according to claim 11, wherein the first portion of the video signal includes one or more vertical blanking intervals (VBIs) of the video signal.

19. A non-transitory computer-readable storage medium, storing instructions which, when executed on a processor, cause the processor to:
 identify a first interference signal from a first portion of a video signal received over an analog transmission link;
 identify a second interference signal from a second portion of the video signal, different from the first portion;
 generate an adjusted first interference signal by adjusting a phase of the first interference signal based on a phase of the second interference signal; and
 subtract the adjusted first interference signal from a plurality of active pixel values of a portion of the video signal.

20. The non-transitory computer-readable storage medium according to claim 19, wherein:
 the first portion of the video signal is a portion of one of vertical blanking intervals (VBIs) of the video signal,
 the second portion of the video signal is a portion of one of horizontal blanking intervals (HBIs) of the video signal, and
 the instructions further cause the processor to:
  repeat identifying the first interference signal for each of a plurality of frames of the video signal, and
  repeat identifying the second interference signal, generating the adjusted first interference signal, and subtracting the adjusted first interference signal for each of a plurality of video lines of each of the plurality of frames of the video signal.

* * * * *